United States Patent [19]

Burnham et al.

[11] 4,202,518
[45] May 13, 1980

[54] AIR-BORNE SUPPORT AND LIFT MECHANISM ADAPTED TO AIRCRAFT

[76] Inventors: J. Kellogg Burnham, Av. Republicas 153 Bis, Mexico City 13, Mexico; Mario H. Gottfried, Jr., Las Flores 278, Los Reyes, Mexico City 21,, Mexico

[21] Appl. No.: 845,933

[22] Filed: Oct. 27, 1977

[51] Int. Cl.² .................... B64C 21/00; B64C 23/02
[52] U.S. Cl. .................. 244/12.1; 244/73 C; 244/204
[58] Field of Search ............ 244/12.1, 12.2, 12.3, 244/23 R, 23 B, 23 C, 73 B, 73 C, 36, 208, 209, 204

[56] References Cited
U.S. PATENT DOCUMENTS

| 1,454,283 | 5/1923 | Hollander | 244/73 B |
| 1,892,460 | 12/1932 | Gayman | 244/12.3 |
| 2,138,999 | 12/1938 | Clark | 244/12.3 |
| 2,989,269 | 6/1961 | LeBel | 244/36 |
| 3,056,565 | 10/1962 | Griffith | 244/12.3 |
| 3,599,901 | 8/1971 | Relkin | 244/12.1 |
| 3,785,592 | 1/1974 | Kerruish | 244/12.2 |

FOREIGN PATENT DOCUMENTS

| 1531436 | 3/1970 | Fed. Rep. of Germany | 244/12.1 |
| 2241160 | 3/1974 | Fed. Rep. of Germany | 244/12.2 |
| 2688 | of 1903 | United Kingdom | 244/73 C |
| 13484 | of 1910 | United Kingdom | 244/73 B |

Primary Examiner—Galen L. Barefoot
Attorney, Agent, or Firm—O'Brien & Marks

[57] ABSTRACT

An air lift mechanism has one or more rotating discs within wells in a top deck. Each disc has cambered convexities on its upper surface. A cylindrical wall of each well has operational ports.

19 Claims, 5 Drawing Figures

AIR-BORNE SUPPORT AND LIFT MECHANISM ADAPTED TO AIRCRAFT

BACKGROUND

Present-day helicopters must have a high ratio of horsepower to gross weight because inherently the lift capability of the rotary wing is low; typically for each horsepower applied less than twenty pounds can be lifted, even with the aid of "ground effect" and at sea level air density, and considerably less at higher altitudes. Their net payload and range are thus severely limited and their unit fuel consumption is comparatively high. Conventional fixed-wing airplanes, which carry considerably greater useful loads than helicopters can in relation to the horesepower employed, have however other inherent limitations consequent upon their design, such as high landing speeds. All present-day aircraft are severely restricted in performance by their necessary dependence upon their relatively fragile wings for support.

Practice of the present invention will provide better aircraft performance than is afforded in the present state of the art. Air vehicles incorporating this invention will have equal cruising speed and range as their counterparts of the present time, but because they will be wingless they will experience less drag, require less horespower and less fuel, and hence will have greater payload capability. Being able to take off and land vertically, such improved aircraft will not depend upon ever more costly airports built ever farther from the cities they serve, as at present, but will also use midtown terminals, or any suitable platform or clearing. They will have increased safety as well as greater versatility and usefulness. The successor to the helicopter, relieved of its slashing rotor, will mutate into a specialized service craft that can press its nose agaist a burning tall building to rescue occupants, and that will carry several times its own weight in payload. Specialized types of craft today unknown will become feasible. Personalized air transport will enable millions to use the air independently as the way to come and go almost everywhere. Numerous fields of application outside of aviation will also benefit from the practice of this invention.

OBJECTS

Thus the general object of the present invention is to provide lift and support in the air to a vehicle adapted to incorporate the invention.

It is a more particular object to provide such lift and airborne support to the vehicle to sustain it in the air without wings.

It is an object of the present invention to provide such support in the air to a vehicle independently of translational movement of the latter.

It is another object to provide such lift to such wingless vehicle by means of a relatively low expenditure of mechanical energy.

It is a further object to provide a compact lift-giving mechanism.

It is still another object to provide such a lifting mechanism which operates without directing a strong current of air downward.

Another object is to provide a lifting mechanism which is not articulated and which requires a minimum of maintenance.

A still further object of the present invention is to apply a substantial portion of the lifting effort distributed on and applied directly to the vehicle structure, keeping spindle loads relatively low.

Yet another object is to provide such full lift capability in a steady and uniform manner while permitting the craft to hover and maneuver as well as to advance at any speed up to its cruising speed.

Still another object is to provide means for incorporating the present novel lifting mechanism into aircraft.

An additional object is to provide the lifting mechanism so incorporated into an aircraft that the said mechanism is shielded by the body structure of the aircraft from attack by flocks of birds, foliage, power lines and other hazards.

It is another object of this invention to provide a more robust and more compact aircraft structure for powered flight through the elimination of fixed or rotary wings.

Still another object is to reduce resistance to passage of the aircraft through the air by eliminating fixed or rotary wings.

A related object is to diminish power requirements for any given airborne mission.

Another object is to reduce the on-board burden of fuel required for carrying a given payload a given distance by air.

A further object is to eliminate the need for conventional heavy and complicated landing gear and related suspension structure such as are required for high speed landings by conventional airplanes.

One major object of this invention is to provide lift means making feasible types of airborne vehicles and structures not yet developed today.

It is another object to provide a lifting mechanism adaptable to uses in fields other than aviation.

These and other objects accomplished by the present invention will become apparent from the following description of embodiments thereof when taken in conjunction with the drawings which accompany and form part of this specification.

DETAILED DESCRIPTION OF THE INVENTION

Figure 1:
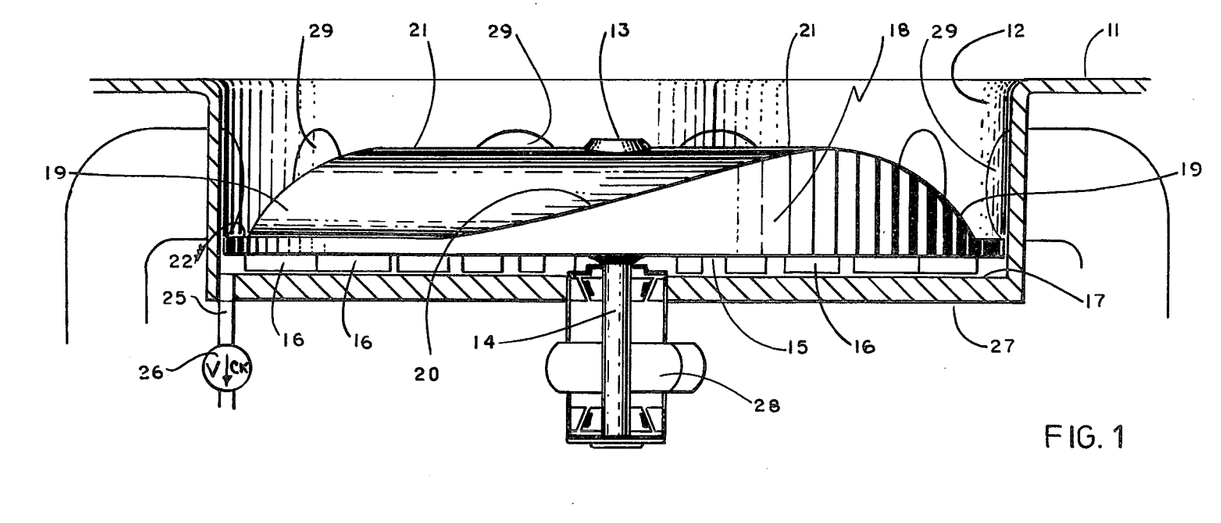
FIG. 1 shows in cross-sectional elevation and partial perspective a first embodiment of the present invention.
Figure 2:
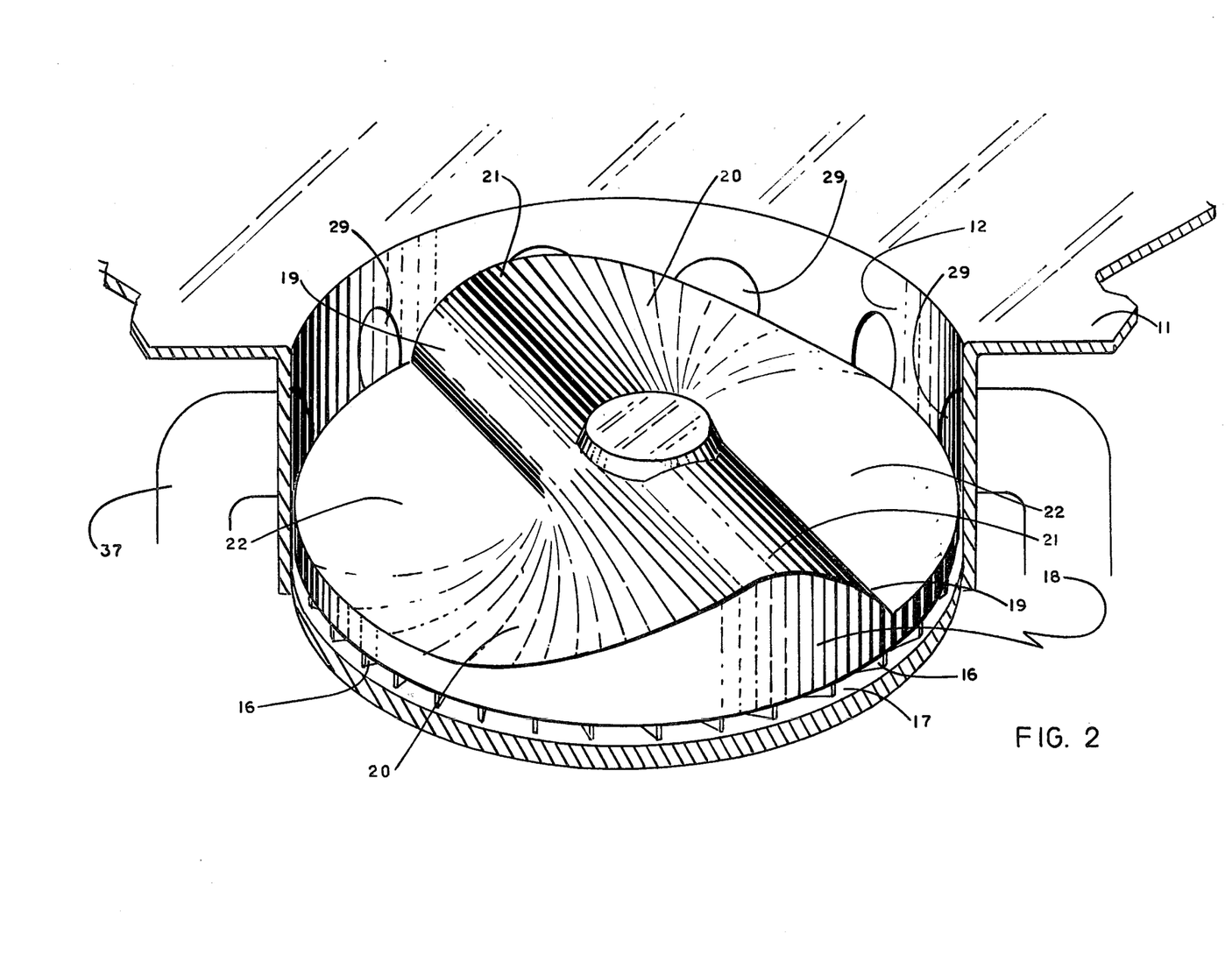
FIG. 2 is a ¾ perspective view of disc of first embodiment of this invention housed in a cut-away well.

In general the present invention contemplates a relatively planiform, normally horizontal upper surface of an aircraft, herein called top deck 11, provided with one or more shallow cylindrical recesses or wells 12, in each such well 12 a horizontal disc 13 being rotatably mounted, said disc 13 having its spindle 14 coaxial with said well 12 passing through and extending downward below sealed well bottom 17 and being powered for rotation, nether surface 15 of said disc 13 being preferably fitted with thin blades 16 near the outer rim thereof to turn with minimum clearance above sealed horizontal well bottom upper surface 17; said disc 13 turns with minimum peripheral clearance within well 12; upper surface of disc 13 comprises symmetrically and generally radially located identical cambered convexities 18, the leading edge or nose 19 of said convexity 18 being rounded but somewhat steeper and shorter than trailing portion 20 of said convexity preferably with a smoothly rounded intervening top portion or hump 21 joining said nose 19 and said trailing section 20 of convexity 18, and horizontal portion 22 of said disc 13 upper surface being faired into trailing portion 20 joining it to nose 19 of following convexity 18, the entire height of hump 21 of said convexity 18 being preferably less than that of cylindrical wall of well 12 and shrouded or shielded thereby.

Well bottom 17 is normally sealed as stated but passages 25 are provided descending therefrom and having automatic float valves 26 or other provision for discharging rain water accumulating in said well. Cylindrical wall of well 12 may include ports 29 which may be instantly opened to various degrees and as quickly closed again in a manner regulated and controlled by the operator, for the purpose of respectively weakening and restoring well lift conditions. Ports 29 in well wall may comprise simple sliding panels or other valving means; when open they communicate well 12 with passages 37 opening to underbody atmosphere, and weaken the lift effect more or less proportionately to the area of the opening, as lift spoilers. Provision for powered or other operation of ports 29 individually regulated as aircraft trim means and manipulated in group for aircraft maneuver may be electrical, hydraulic, mechanical or by other suitable means.

The above-described assembly of top deck 11 with well 12 housing disc 13 with its spindle 14 powered for rotation, disc upper surface 22 with convexities 18 formed thereupon and optional ports 29 in wall of well 12 is hereinafter designated the kelmar; when disc 13 turns at normal speed in air a steady upward impulse is transmitted to the aircraft structure. For any given horsepower input, the lift produced by the kelmar compares favorably with the lift produced by a conventional helicopter rotor driven by equal horsepower.

The kelmar is driven by power means operative on its spindle 14. Such means may comprise mechanical drive systems such as but not limited to gearing, chain, belt and the like; they may also include turbine means and hydraulic means. Where the aircraft is powered by one or more jet engines, blast from a jet can be diverted to power turbo rotors connected to such spindles as is suggested by turbine 28 shown mounted on spindle 14 in FIG. 1. The plurality of spindles may be so geared or otherwise linked together as to synchronize their rotation, the discs then producing a composite beat or a selected beat pattern, with enhanced lift. The operator can vary the lift obtained from any individual kelmar through operation of respective port closures 29 or spoilers. Again, if individual drives are provided for the several kelmar discs 13 their speed of rotation can be respectively varied for purposes of trim and maneuver. Other control and trim means available include operable vanes or movable panels (not shown) above kelmar discs 13.

HOW IT WORKS Functioning of the kelmar is related, inter alia, to some of the following observed and inferred phenomena:

Item: nose 19 of convexity 18 at its normal subsonic rotational speed produces a sonic compression wave directed forward and partially upward of the instantaneous nose position as it rotates, the wave running above and also outside of well 12. Immediately behind the pressure wave the air tends to re-expand at a slower rate and in all directions, producing in the circle described a pulsing dynamic "parasol" of lower pressure air extending above and outside of well 12, over top deck 11.

Item: nose 19 produces a subsonic disturbance as it impacts the air, the disturbance billowing outward over well 12 and over surrounding top deck 11 and producing a low pressure parasol.

Item: the cambered convexity as it rotates produces a low pressure area above it like that of, for a rough analogy, the upper surface of a conventional airfoil.

Item: a jet of air tangent to inside wall of well 12 is created at juncture of nose 19 and said wall, moving ahead of nose and upward in a direction roughly normal to nose surface at a higher speed than nose peripheral velocity, forming a spurt or wand swinging around and above disc 13 and surrounding top deck 11 and producing a low pressure parasol.

Item: air thrown peripherally upward and outward by rotation of disc 13 is replaced with air drawn down and onto the center of disc 13.

Item: rotation of kelmar disc 13 produces a lower overhead air pressure due to relative motion between air and disc surface, per Bernoulli, than that pressure prevailing in the air mass at rest beneath aircraft in hovering mode, the said pressure difference continues to prevail even when the aircraft experiences translational movement.

Through action or interaction of one or more of the above listed causes, inter alia, an area of lowered air pressure is created over the kelmar and extends over the surrounding top deck 11. Upon underbody 27 of the aircraft structure subjacent to well 12, however, undisturbed air exerts ambient pressure upward. When the unbalanced upward pressure difference exceeds the downward pull of gravity upon the aircraft, the latter is borne upward; when they are in balance, it hovers; when the unbalanced upward thrust is less than the pull of gravity on the aircraft, the latter descends. This lift action is in general independent of translational movement of the aircraft, as a first approximation. When translational movement is present, the said pressure differences persist. Proper aerodynamic conformation of the aircraft will enable it to obtain increasing lift as its translational speed increases, supplementing or wholly replacing the lift of the kelmars at predetermined air speed.

Comparatively little of the kelmar lift effect is carried as a tensile load by disc spindle 14. The lowered pressure operative over kelmar disc 13 is offset by lowered pressure operative in the clearance space which separates nether face of disc 13 from well bottom 17; when the latter pressure drop is greater, spindle 14 carries a compressive stress instead of tensile. The partial vacuum distribution in the said clearance space is unlike that above disc 13, and the above reference is merely to rough totals of upward and downward stresses. Mention of these upward and downward stresses serves to emphasize the contrast with a helicopter spindle, which must bear the entire lift effort and various other stresses and other functions as well.

Reduced air pressure effective upon well bottom 17 is opposed by full ambient air pressure acting upwardly on the corresponding subjacent portion of aircraft structure. Thus the lift effort is applied directly to the aircraft structure. The same observation applies to reduced pressure prevailing over top deck 11, opposed by full ambient pressure upward on the respective aircraft underbody areas.

The foregoing interpretation of the way the kelmar functions is submitted as part of the essential description, not as a foray into abstract principles. It generally describes observed performance. It departs somewhat from the classical theories of airfoils; but whatever the validity of the latter, they are not applicable in a body to the kelmar, for the kelmar is not an airfoil.

An airfoil is, by definition in its own terms, a blade (foil) or member which passes through the atmosphere and which produces differential effects in the air as between its upper and its under surface, generally to produce lift or thrust. By contrast, kelmar disc 13 is ensconced away from the free flow of the air, and only one of its surfaces even communicates therewith. Another outstanding difference between an airfoil and a kelmar disc is that the conventional airfoil produces a downward thrust upon the air beneath it, or in the equivalent direction when the airfoil is in other than a horizontal position. The kelmer, in contrast thereto, produces no downward thrust upon the subjacent air. Thus it is not comparable to a helicopter rotor, and the kelmar produces a considerably greater lift in pounds per horsepower without depending on ground effect and without stirring up the dust. The kelmar disc 13 cannot have a stagnation point or a trailing edge vortex since, unlike airfoils, it has no air mass split ahead, part passing underneath, and both parts rejoining behind it.

There are, however, some similarities of function between the kelmar and conventional airfoils. The results obtained in extensive research that has been carried out with regard to boundary layer phenomena in airfoils, for example, will have modified application in kelmar design.

Construction of kelmar disc 13 can be accomplished in a variety of ways: it can be made of sheet metal or other robust stock of thin gauge shaped and fitted over a rib structure, or of unsupported heavier stock shaped by stamping or the like; it can be molded in plastic of appropriate characteristics, or assembled from components of suitable strength and rigidity. It must be symmetrical, accurately balanced, and solidly mounted on its spindle with precision clearance in its well.

The appropriate speed of rotation depends upon the installation, power supplied, load rating, conformation of the convexity, etc. As an indication of range, a 4' diameter disc might have a speed of rotation between 1500 and 3600 rpm, and an 8' disc between 800 and 1800 rpm, in subsonic operation. The height of the kelmar convexity may preferably range between about 1/15 and 1/5 of the disc diameter, again depending on power, lift and rpm designed for. The full height at least of the convexity of the kelmar disc 13 is preferably shielded by well wall 12.

The speed range for kelmar disc indicated above assures kelmar action and resulting air velocities around the unit remaining well below Mach 1, in line with the type and proportions of convexity 18 described. Ideally a given convexity is designed for a specific relatively narrow range of rotational speed, depending on the specific characteristics of the individual application (power, loading, service, etc.). This is advisable because for any specific design substantial variations in air density must be allowed for because of the broad climatic, seasonal and altitude range of atmospheric characteristics throughout which the given kelmar unit must operate consistently with optimum performance.

Supersonic operation of kelmar is also contemplated, with a number of modifications including a lower profile and a generally biplanar shape replacing the convexity used for subsonic service. The rounded juncture of the two planes originates a shock wave trailing the disc in a rising shallow expanding spiral projected harmlessly away from the earth's surface, the leading plane set preferably at 6° to 15° to disc surface and trailing edge at 2° to 5° thereto, with elongated smooth fairing joining the said planes to said disc.

SECOND EMBODIMENT

Figure 3:
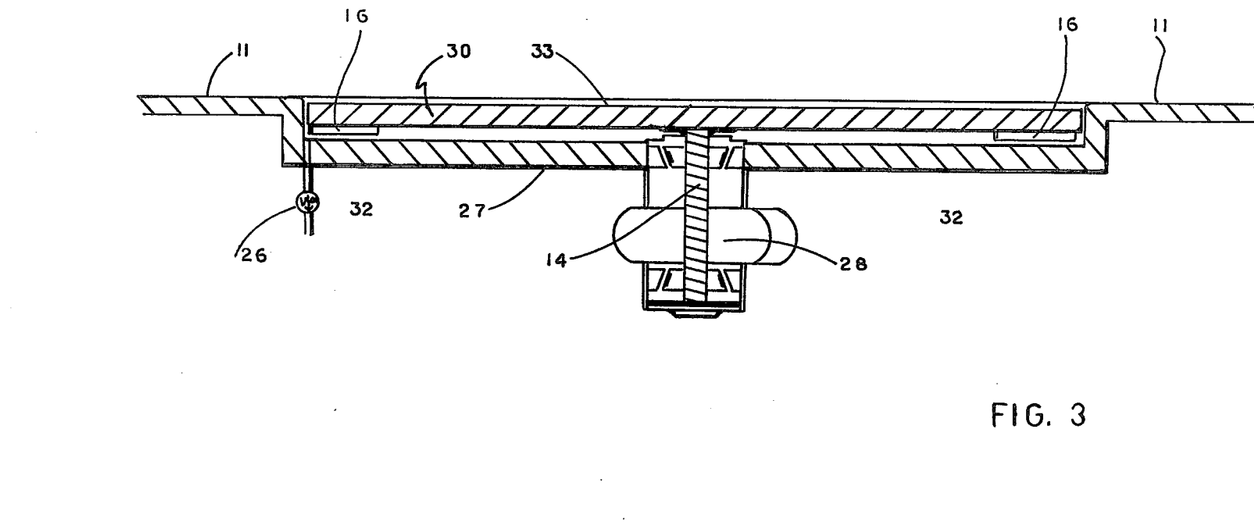
FIG. 3 shows in cross-section in elevation a second embodiment of the present invention.
Figure 4:
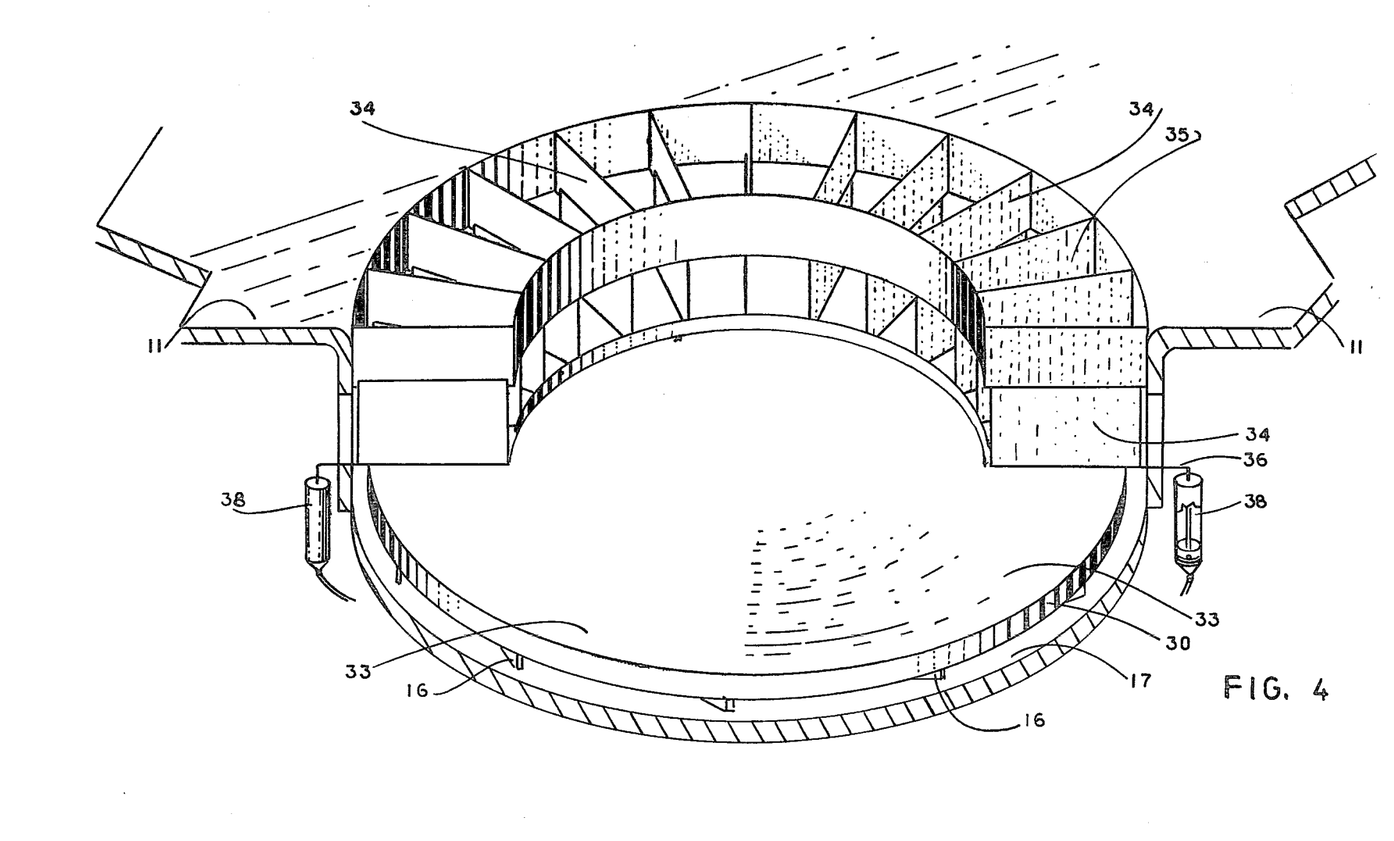
FIG. 4 shows in perspective and partial cut-away the second embodiment.

A second embodiment of the present invention is herein designated the Spinlift. It comprises an upper relatively horizontal vehicle surface herein called top deck 11 provided with one or more shallow cylindrical recesses or wells 12, in each such well 12 a disc 30 being rotatably mounted and having its spindle 14, powered for rotation, generally coaxial with said well 12, said disc 30 having restricted peripheral clearance within its well 12, generally flat nether surface 31 of disc 30 being preferably fitted with thin blades 32 near the outer rim thereof to turn with minimal clearance above sealed horizontal well bottom upper surface 17; the upper surface 33 of disc 30 is substantially flat, or uniformly dished, or lens-shaped, disc upper surface 33 being preferably set slightly below the level of the surrounding top deck 11. Variation in the lift effort generated is regulated at will by operator through changes in disc rotational speed, for which suitable controls are provided.

In a variation of the above spinlift embodiment of the present invention a grid or honeycomb 34 of passages 35 parallel to axis of well 12 and generally perpendicular to disc surface 33 may be placed substantially flush with top deck 11, said passages 35 extending downward toward upper surface 33 of disc 30, said grid 34 optionally being adapted for downward movement in said well 12 to permit bringing the lower orifices of said generally perpendicular passages 35 close to but not into actual contact with said upper surface 33 of disc 30, such vertical movement of grid 34 being a powered travel effected at the will of the operator, fine graduations of such grid travel providing regulation of the lift effort produced. In FIG. 4 a fixed grid set flush with top deck 11 is combined with a telescoping second grid impelled by a plurality of rods 36 and hydraulic cylinders 38 toward disc upper face 33.

Other means for graduating the effective lift include louvres or shutters of variable position mounted over the mouth of well 12 (not shown) to restrict communication between air layer over disc upper surface 33 and air above top deck 11, regulated by operator.

Spinlift, like kelmar, is obviously not an airfoil; the same reasons adduced above apply to this embodiment.

Operation of the embodiment herein called spinlift is related to the Bernoulli proposition that a surface in motion relative to an air mass experiences reduced pressure. A reduced pressure over the rotating disc upper surface 33 is opposed by a normal ambient air pressure applied upwardly to the subjacent underbody of the aircraft, with consequent net lift effect. Where rotating upper surface 33 of disc is exposed directly to stationary superjacent air the upward moment is measurable and increases with increase in the speed of rotation of disc 30. This upward moment is increased through the use of grid 34 of vertical passages, presumably for the reason that direct channeled communication is established between lowered pressure on disc surface 33 and prevailing superjacent atmospheric pressure, with less dissipation of the useful pressure difference in random intermediate currents as movable grid is brought closer to said disc surface 33. The closely encircling wall of well 12 contributes to this effective containment of pressure difference. Concomitant reduced pressure in the clearance space between disc nether surface 31 and well bottom upper surface 17 causes the application of a substantial part of the total lift action as "suction" or differential pressure bearing upward on the aircraft body structure subjacent to well bottom, thereby minimizing the spindle load, as already noted relative to the kelmar embodiment.

Observations given above are largely applicable as well to spinlift.

AIRCRAFT INCORPORATING INVENTION

The aircraft into which kelmar or spinlift is incorporated is an essential element of the present invention. In the embodiment of such aircraft herein described and represented in FIG. 5 it is characterized by the provision for the purpose of lift of top deck 11 replacing the obsolete wings of the prior art; top deck 11 is relatively wide, optionally cambered over its length, of sufficient thickness to house wells 12 and drive mechanism 28 therebelow, and to incorporate passages and optional fuel storage. Said top deck 11 may overlie or form the upper surface of fuselage or cabin, with optional lateral overhang; it may preferably be provided on each side with an outboard longitudinal generally vertical fin or vane serving to direct the parasol of low pressure air generally upward and prevent weakening of lift parasol outboard to the sides. The outboard longitudinal vertical vanes also provide anti-yaw stability; they may be provided with rudders at their aft ends for added directional control and stability. These rudders 39 attached to outboard vanes 41 may be coordinated for use with an articulated stabilizer or elevator member 40 forming the aft end of the top deck 11, lying athwart it in the horizontal plane and serving to give the aircraft attitude control at speed. Near the forward end of the lateral lengthwise vanes 41 other articulated control surfaces 42 functionally similar to ailerons may be provided for banking control, in either a horizontal or a butterfly tilted position.

Figure 5:
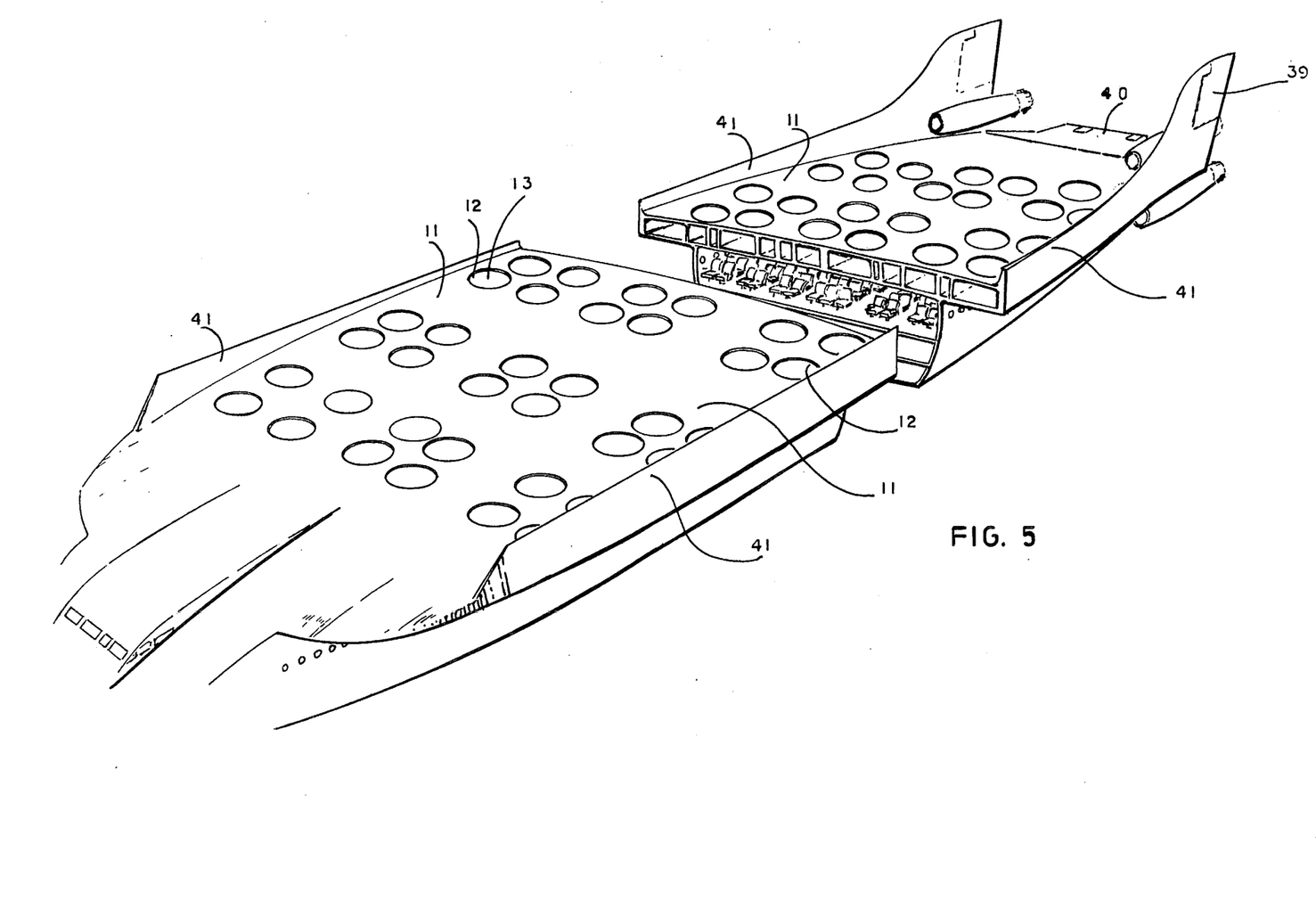
FIG. 5 shows in perspective and in partial section a transport aircraft adapted to the practice of this invention.

The transport illustrated in FIG. 5 is powered by four aft-mounted fanjet engines having clam-shell thrust reversers as well as swing nozzles permitting angular discharge of jet blast at any angle as determined by operator, to provide the aircraft with added control and maneuver capability, particularly in the hover mode of operation. Each engine 43 is also able to direct its blast partially into passages within topdeck 11 carrying the partially cooled and diluted fanjet discharge to drive turbines 28 of the several kelmar or spinlift units mounted in said topdeck 11.

The spindles 14 of the jet-powered kelmar or spinlift aircraft can be powered with a portion of the power output of any one engine, thus achieving a uniquely high engine-out safety rating. Emergency JATO provisions may be incorporated as well, for temporary emergency lift even with all power gone. Replacement of relatively fragile wings of the prior art with the sturdy top deck structure provides a more robust structure, and atmospheric shear forces cease to be a hazard. Total air resistance to forward movement is also reduced, diminishing power requirements per payload ton mile, permitting the reduction of engine weight and of fuel consumption per mile, making more payload possible.

The hovering and VTOL capabilities of the proposed kelmar or spinlift aircraft provide greater versatility and usefulness, and emancipate the aircraft from the giant airport complex. At the same time the need for high-speed landing gear and related structures is obviated, thus also saving weight and cost.

PLATFORMS

Either kelmar or spinlift may also advantageously be incorporated into numerous mechanisms other than long-range aircraft, in which lift but not necessarily free flight is required. Thus for heavy lift service in construction and in cargo-handling in industry and transport one or more kelmars incorporated into a platform that is provided with stabilizing means and connected to a control tether or a telescoping boom can provide load hoisting and spotting at any desired height with great precision and without the problem of providing a stabilized crane base. In lumbering, in fire fighting and rescue action, where work must be performed on short notice and at heights beyond those reached by conventional ground-based hoisting equipment, the tethered kelmar or spinlift platform provides a new long reach, operable either remotely from the ground or from aboard the work platform, with a wide horizontal radius of operation not possible for the conventional ground-supported boom.

The foregoing indication of novel applications and capabilities is suggestive but not restrictive, since it is impracticable to enumerate here the range of applications for the practice of the teachings of the present invention.

All of the objects of the invention enumerated above are accomplished by the present disclosures. The scope and breadth of the present invention, however, obviously extends beyond the cited objects and the specific examples given in the foregoing description, being rather that of the appended claims taken in conjunction with the said description.

We claim:

1. An apparatus for producing lift for a flying vehicle, comprising a top deck of a flying vehicle having one or more shallow cylindrical wells inset thereinto, each well having a cylindrical wall and a sealed floor, a disc in each well adapted and powered for rotating therein with restricted peripheral clearance from the wall and from the sealed floor of said well, said disc being generally parallel to said top deck of said vehicle, said disc's upper face having a plurality of cambered convexities symmetrically distributed thereupon, said well's cylindrical wall extending upwardly higher than and thus shielding said cambered convexities from an airstream which may be produced on said top deck of said flying vehicle, the wall of said well having operational ports susceptible of being rapidly opened to any desired degree and rapidly closed at will by operator, and said ports when open communicating said well with atmosphere below said flying vehicle as lift spoiler means, the entire assembly constituting a first embodiment of a regulatable mechanism to provide lift and airborne support to an appropriate vehicle.

2. An assembly as set forth in claim 1 and including one or more valved passages descending from said sealed well bottom to provide discharge of water accumulating in said well.

3. An assembly as set forth in claim 1, further characterized in that a plurality of said discs in respective adjoining wells are so synchronized in their rotation as to coordinate and enhance the beat and consequent air disturbance.

4. An assembly as set forth in claim 1, wherein said top deck is a structure comprising also the ceiling of a cabin.

5. An assembly as set forth in the claim 4, wherein said top deck is a structure incorporating also passages for jet blast.

6. An assembly as set forth in the claim 5 wherein said top deck structure also incorporates fuel storage provisions.

7. An assembly as set forth in claim 1 wherein said top deck is incorporated into an aircraft having no fixed or adjustable wings.

8. An assembly as set forth in claim 1 wherein said top deck is incorporated into an aircraft having no rotary wings or rotor blades.

9. An assembly as set forth in claim 1 wherein said top deck is incorporated into an airborne platform.

10. An assembly as set forth in the claim 9 wherein said platform is secured to a base unit.

11. An assembly as set forth in claim 1 wherein said top deck is bounded laterally by longitudinal vanes.

12. An assembly as set forth in the claim 11 wherein the said top deck at its aft end terminates in a horizontal movable elevator member usable for stabilizing and controlling aircraft attitude.

13. An apparatus as set forth in claim 1 wherein each disc's nether surface is fitted with thin blades at the rim of the disc adapted to produce an accentuated reduction of pressure between the disc nether surface and the sealed floor of the well.

14. An apparatus as set forth in claim 1 wherein each disc upper surface has a flat portion and each cambered convexity comprises a convex upwardly arching forward directed nose; a rounded top portion joined with the nose, and a relatively less steep downwardly sloping trailing portion extending from the top portion to the flat portion of the disc upper surface.

15. An apparatus as set forth in claim 1 including a spindle on which the disc is supported and a hermetic collar in the well floor through which the spindle extends, the spindle adapted to be rotated by power means below the well floor.

16. An assembly as set forth in claim 15 further characterized in that said disc is solidly secured to said spindle with no articulation.

17. As assembly as set forth in claim 15 further including power means to drive said spindle, said power means including a turbine powered by engine blast diverted thereto for that purpose.

18. An assembly as set forth in claim 15 further including power means to drive said spindle, said power means including a power train drive.

19. An apparatus for producing lift for a flying vehicle comprising a top deck of a flying vehicle having one or more shallow cylindrical wells inset thereinto, said well having a cylindrical wall and a sealed floor, a disc in each well adapted and powered for rotating therein with restricted clearance from said cylindrical wall and from the sealed floor of said well, said disc being generally parallel to the top deck surrounding said well, said disc adapted to rotate at a speed creating a reduced air pressure thereabove; a grid assembly of vertical passages is mounted above said disc in said well and means for moving at least a portion of said grid closer to the top of said disc or withdrawn an appreciable distance therefrom under the control of an operator.

* * * * *